(12) United States Patent
Mahnad

(10) Patent No.: US 9,430,366 B2
(45) Date of Patent: Aug. 30, 2016

(54) DISTRIBUTED LOGICAL TRACK LAYOUT IN OPTICAL STORAGE TAPE

(71) Applicant: Oracle International Corporation, Redwood City, CA (US)

(72) Inventor: Faramarz Mahnad, Brookline, MA (US)

(73) Assignee: Oracle International Corporation, Redwood City, CA (US)

( * ) Notice: Subject to any disclaimer, the term of this patent is extended or adjusted under 35 U.S.C. 154(b) by 99 days.

(21) Appl. No.: 14/459,730

(22) Filed: Aug. 14, 2014

(65) Prior Publication Data

US 2016/0049174 A1 Feb. 18, 2016

(51) Int. Cl.
*G06F 12/00* (2006.01)
*G11B 20/12* (2006.01)
*G06F 12/06* (2006.01)
*G11B 7/003* (2006.01)
*G11B 7/14* (2012.01)
*G11B 7/24009* (2013.01)
*G06F 3/06* (2006.01)
*G11B 27/10* (2006.01)

(52) U.S. Cl.
CPC ............. *G06F 12/00* (2013.01); *G06F 12/06* (2013.01); *G11B 7/003* (2013.01); *G11B 7/14* (2013.01); *G11B 20/1217* (2013.01); *G06F 3/0686* (2013.01); *G11B 7/24009* (2013.01); *G11B 27/107* (2013.01); *G11B 2020/1242* (2013.01)

(58) Field of Classification Search
None
See application file for complete search history.

(56) References Cited

U.S. PATENT DOCUMENTS

| | | | |
|---|---|---|---|
| 5,710,676 A | 1/1998 | Fry et al. | |
| 5,819,061 A * | 10/1998 | Glassen | G06F 12/109 711/173 |
| 6,105,103 A * | 8/2000 | Courtright, II | G06F 3/0608 707/999.202 |
| 6,141,312 A * | 10/2000 | Masters | G11B 7/003 369/97 |
| 6,609,176 B1 * | 8/2003 | Mizuno | G06F 3/0601 711/112 |
| 7,461,198 B2 * | 12/2008 | Tsai | G06F 12/0246 365/185.11 |
| 8,014,239 B2 | 9/2011 | Coles et al. | |
| 8,189,432 B2 | 5/2012 | Mahnad | |
| 8,493,823 B1 | 7/2013 | Edling et al. | |
| 8,514,675 B2 | 8/2013 | Mahnad | |
| 8,614,935 B2 | 12/2013 | Mahnad | |
| 2002/0059505 A1 * | 5/2002 | St. Pierre | G06F 11/1469 711/162 |
| 2002/0085433 A1 * | 7/2002 | Tomori | G06F 12/0246 365/200 |
| 2004/0111580 A1 * | 6/2004 | Weber | G06F 3/0607 711/173 |
| 2005/0050263 A1 | 3/2005 | Ashton et al. | |
| 2005/0177673 A1 * | 8/2005 | Oberlaender | G06F 12/0886 711/3 |
| 2008/0244171 A1 | 10/2008 | Ashton et al. | |
| 2012/0307389 A1 | 12/2012 | Cideciyan et al. | |

OTHER PUBLICATIONS

International Search Report mailed Sep. 11, 2015 for PCT/US2015/044780, Filed Aug. 12, 2015, 3 pgs.

* cited by examiner

*Primary Examiner* — Carlos E Garcia
(74) *Attorney, Agent, or Firm* — Brooks Kushman P.C.

(57) ABSTRACT

An optical data storage tape includes more than one segment, with each segment divided into multiple zones, which include multiple data tracks. The layout of the logical zones in one segment is in a different order than those of another segment. In an example, the tape includes at least N physical segments, at least M physical zones in each segment, at least M logical zones assigned to the M physical zones, and wherein logical zones of adjacent physical segments are in a different order than an adjacent physical segment.

15 Claims, 6 Drawing Sheets

DISTRIBUTED LOGICAL TRACK LAYOUT IN OPTICAL STORAGE TAPE

TECHNICAL FIELD

This disclosure relates to the field of optical storage tape, and in particular focuses on structures and methods for logical track layout(s).

BACKGROUND

Tape data storage systems can have multiple data tracks that are engaged by an associated read/write heads. The data tracks can include multiple lines of data, e.g., bits stored or bit areas to be written. Tape systems with multiple recording heads have independent actuating structures for each recording head along with dedicated control systems. However, in such a simple system one to one physical to logical address assignment of heads and tracks introduces at least two problems. First, physical tolerances associated with dynamic range of each head can be a problem. For example, when all heads are placed at the far edge of their dedicated track it maximizes the probability of more heads not being able to reach all the desired tracks. Second, the power consumed by the dedicated head actuators increases as the heads move from the center of the respective track. Maximum power is needed and consumed when all heads are placed at the far edges of zones based on the need for all the actuators to move the heads a maximum distance from the center at the same time.

SUMMARY

A storage medium or an optical data storage tape includes more than one segment, with each segment divided into multiple zones. The layout of the logical zones in one segment is in a different order than the logical layout of zones of another segment. The tape can be used in a data storage system. In an example, the tape includes at least N physical segments, at least M physical zones in each segment, at least M logical zones assigned to the M physical zones, and wherein logical zones of adjacent physical tape segments are in a different order than an adjacent physical segment.

In an example, a first logical zone is in a first physical zone and an M logical zone is in a last physical zone for a first physical segment of the storage medium.

In an example, the Mth logical zone is in a first physical zone and an M−1 logical zone is in the last physical zone for a second physical segment of the storage medium.

In an example, the M−1 logical zone is in a first physical zone and an M−2 logical zone is in the last physical zone for a third physical segment of the storage medium.

In an example, a second logical zone is in a first physical zone and a first logical zone is in the last physical zone for an Nth physical segment. The Nth physical segment can be the last segment and remote from the first segment of the storage medium.

The above tape examples can be used in an optical data storage tape system that can include one or more optical tape drive units for reading a plurality of logical storage segments. In an example, the optical tape to be read by the optical tape drive units, the optical tape having a plurality of physical segments, the physical segments each having M physical zones. The logical zones of adjacent physical segments are in a different order than at least one other logical segment.

In an example system, a first physical segment includes logical zones in the order of [1, 2, 3, . . . , M−1, M].

In an example system, a second physical segment of the storage tape includes logical zones in the order of [M, 1, 2, 3, . . . , M−1]. The second segment can be adjacent the first segment.

In an example system, a third physical segment includes logical zones in the order of [M−1, M, 1, 2, 3, . . . , M−2]. The third segment can be adjacent the second segment.

In an example system, an Mth physical segment includes logical zones in the order of [M−(M−1), . . . , M−1, M, 1]. The Mth segment can be the most remote segment from the first segment.

In an example system, the N optical tape drive units have at least one read head not at an edge of a physical segment based on the reordering of the zones in at least one segment relative to other segments.

In an example system, the N optical tape drive units have at most two read heads at an edge of respective segments.

In an example system, the logical zones are uniformly scattered among the different physical segments.

In an example system, the N optical tape drive units consume at most half power as compared to case with all heads of the at least one read head N optical tape drive units being at an edge of the segments.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
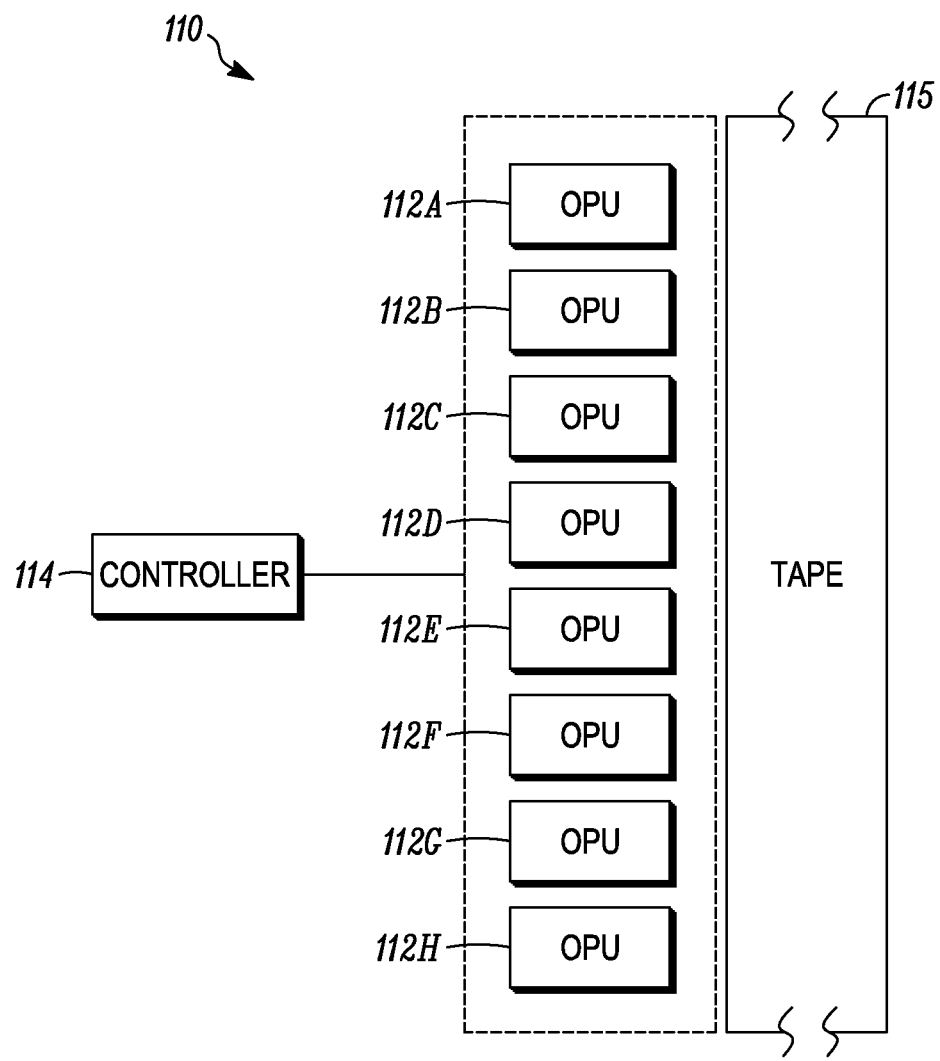
FIG. 1 is a schematic diagram of portions of a data storage system.

FIG. 1 shows a data storage system 110 that may include, inter alia, a plurality of pickup units 112 (e.g., 112a-112h) and a controller 114. The pickup units can be optical pickup units, magnetic pickup units or other type. Each of the pickup units 112 may generate an optical beam that when focused on a physical track of the data storage medium 115 (e.g., tape, optical tape, or the like), writes data to or reads data from the physical track under the control of the controller 114 as the storage medium 115 moves past the pickup units 112. The storage medium 115 stores binary data on its physical tracks, which can be grouped together in zones that can be in turn grouped together in segments. In an example, one pickup unit 112 reads or writes to all tracks in a segment. Controller 114 includes circuitry to process instructions to issue operational signals to the optical pickup units and provide an interface to other circuitry (no shown). In the example of FIG. 1, the storage medium system 110 includes eight pickup units 112. The number of pickup units in other examples may of course be different. An alternative storage medium system, for example, may include six, twelve or twenty four pickup units or other $2^N$ units. However, the greater the number of pickup units the greater the energy consumed to move the pickup units to the appropriate track to be read or written.

A pickup unit is set on supporting structure to align with a track on the storage medium (e.g., tape) and is adapted to read or write data to its assigned track on the storage tape. The pickup units 112 are then laterally moveable within their zone so that they can align with and read/write with a specified track within the storage medium. Each pickup unit 112 is movable within a corresponding segment of the tape 115, for example, upon command by the controller. Each pickup unit 112 can then read data on a track. However, moving the pickup unit 112 consumes electrical energy and gives off heat with the system. In operation, instructions can direct electrical energy to each pickup unit 112 to cause the units to move laterally to align with a zone to read at a track within a segment of the storage medium (segments, zones and tracks not shown in FIG. 1). However, a segment will be aligned with the pickup units 112A-112H.

When reading or writing to the storage medium 115, the computing system using the pickup unit reads or writes data to a location that is identified by an address. This address identifies the physical location on the storage tape 115, e.g., the physical location can be a track or tracks in various zones or segments. As described in greater detail herein, the logical designations of the tracks in the zones on the storage tape may be assigned to different physical tracks. In an example, the order of the logical zones is not the same in all segments.

Figure 2:
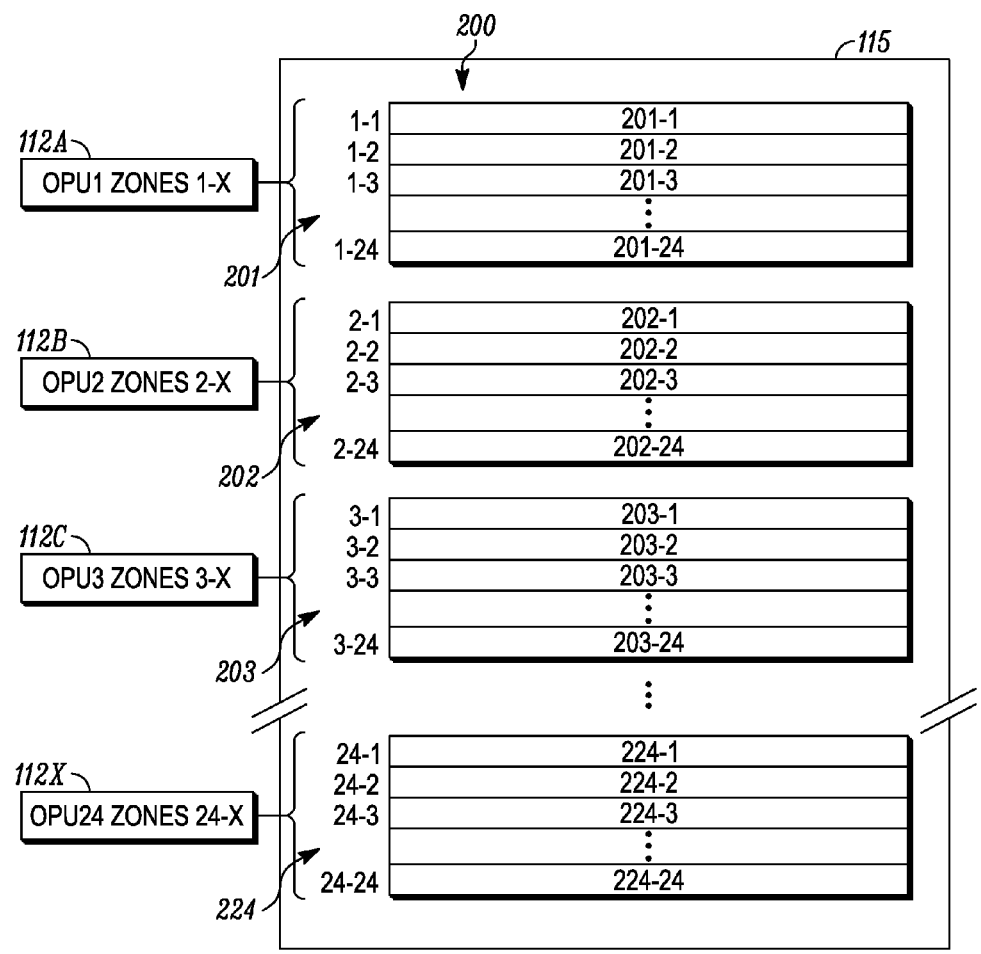
FIG. 2 shows an embodiment of a layout of a storage medium.

FIG. 2 shows a physical segment/zone layout 200 of an optical storage tape 115 that has a plurality of segments 201-224. While shown as twenty-four segments in FIG. 2 it will be appreciated that any number N segments are within the scope of the present disclosure. Each segment 201-224 is associated with one optical pickup head 112a-112x. The segments 201-224 are individually read from and written to by an aligned optical pickup head. Each segment 201-224 is divided into a plurality of zones, here designated with the segment number (i.e., 201-224) with a suffix for the zone, -1 through -24. The first physical zone of the first segment is labeled as 201-1. The second physical zone of the first segment is labeled as 201-2. The third physical zone of the first segment is labeled as 201-3. The zones continue in order labeled 201-4 through 201-24. The last physical zone of the first segment is labeled as 201-24. The other segments 202-224 have the same layout of zones "-1" through "-24." Each zone within a segment is read from or written to by the associated pickup unit, 112A-112X.

Each segment is an elongate area divided into zones that are divided into tracks in which data, e.g., binary data bits, are stored. An aligned optical pickup for each segment moves laterally so that it can read from any one of the zones in its corresponding segment. The physical segments are laid out and labeled in order. In the FIG. 2 example, the top zone is designated with the suffix "-1" and is the top zone in each segment 201-224. The bottom zone is designated with the suffix "-24" and is at the same physical location in each segment 201-224. As shown in the FIG. 2 embodiment, the physical zones of each segment correspond to the logical zone that is addressed by the controller. Each of the optical pickup heads is individually controlled and can access any zone within its associated segment.

It will be recognized that the segment 201-224 can be divided into any number of zones, e.g., six, twelve, thirty-six, sixty four or other. In an example, when data is read from zone "-1", then all of the optical pick up heads move to the extreme edge of the respective segment. The movement of all the heads to one side of each segment 201-224 will require a higher level current draw than movement to an internal segment, e.g., non-"-1" or non-"-24" zone. Long movements of the optical pickup unit create heat at the pickup unit. An example of a long movement is moving the pickup unit to the first zone, i.e., 201-1, 202-1, . . . or 224-1. An example of a long movement is moving the pickup unit to the last zone, i.e., 201-24, 202-24, . . . , or 224-24. The optical pickup pickup unit are electrically driven and typically sit at center, for example, at zone "-11", "-12", or "-13," and may be biased to this position by a spring. The pickup unit is moved by injection of current to activate an actuator of the pickup unit to move and hold the pickup unit at a zone that is not the rest position to allow the pickup head unit to read at a track in the zone. The electricity draw of a pickup head produces heat, which must be dissipated. In an example, one pickup head may consume 0.3 watts per track, or more. Accordingly, when there are twenty-four zones and associated pickup heads, the power consumption can be up to 7.2 watts when the pickup head moves from one edge to the other edge. The typical power consumption is (0.3 watts per head times 24 heads)/2 with the pickup head at rest in the center of the segment.

Figure 3:
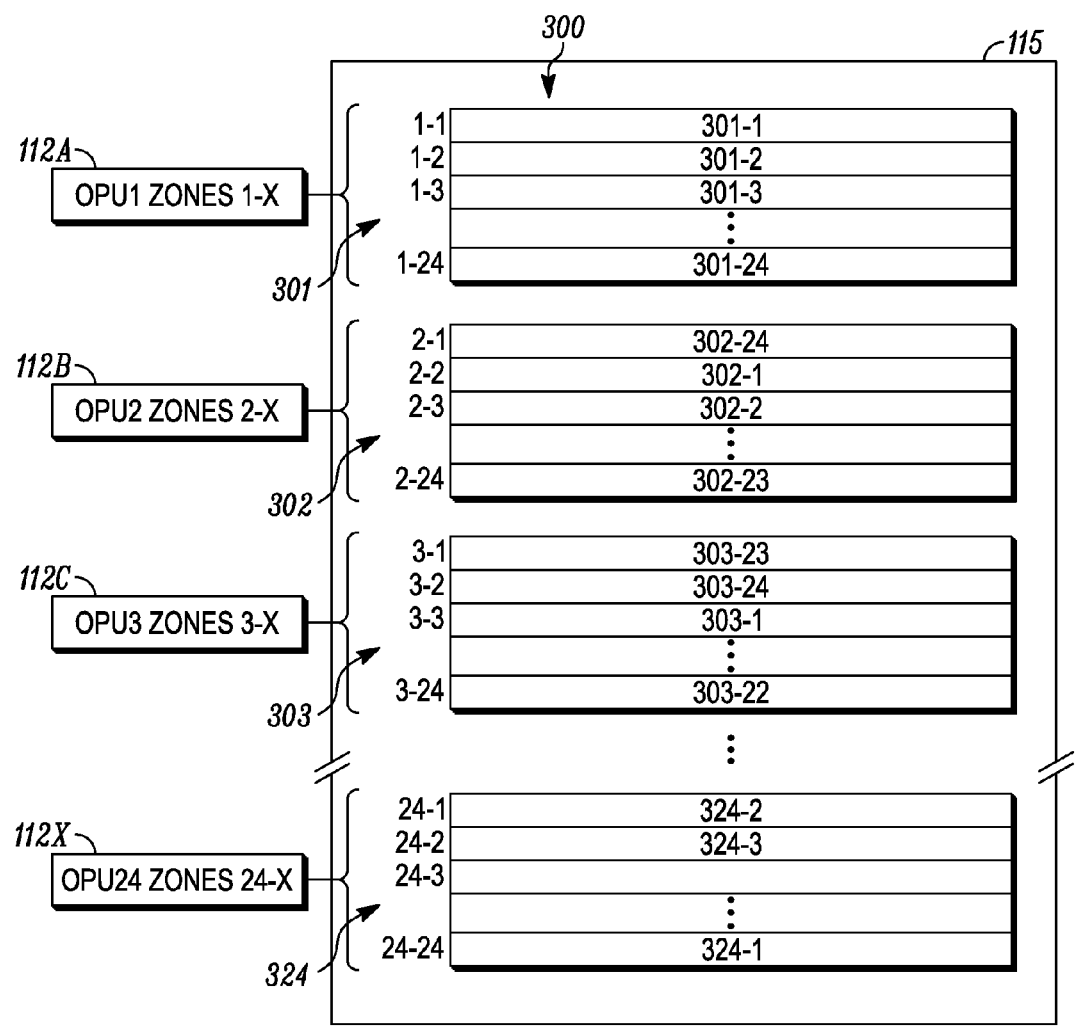
FIG. 3 shows an embodiment of a layout of a storage medium.

FIG. 3 shows a logical segment/zone layout 300 of a storage medium 115, e.g., optical storage tape. Layout 300 is similar to the FIG. 2 embodiment, however, the order of the zones as addressed are different than their physical layout in at least one segment. At least one segment has zones that are assigned logical locations or addresses that do not correspond to the sequential physical zones. At least one of the other first logical zones ("-1") of another segment are assigned to a different physical zone. This results in at least one pickup unit need not move to either edge zone when the data is to be read from zone "-1" or "-24" when the desired pickup unit is directed to one of the edge zones of a segment.

As shown in the FIG. 3 example, the first segment 301 has the same zone layout as zone 201 shown in the FIG. 2 example. The physical zones are sequentially labeled with a segment number and a zone number, e.g., 1-1, 1-2, etc. In the layout 300 the first logical zone 301-1 corresponds to the first physical zone 1-1. The second logical zone 301-2 corresponds to the second physical zone 1-2. The third logical zone 301-3 corresponds to the third physical zone 1-3. The last logical zone 301-24 corresponds to the last zone 1-24. In the second segment, the first logical zone 302-1 is at the second physical zone 2-2 of segment 302. The first physical zone 2-1 of segment 302 is logical zone 302-24. In track 302, the final physical zone 2-24 is logical zone 302-23. Whereas in segment 301 the final logical zone is 301-24 and is at physical zone location 1-24. The logical zones 302-1, 302-2, 302-3, . . . 302-24 of the next segment 302 are shifted relative to segment 301. Here, the logical zone 302-24 is moved from the last physical zone 2-24 and assigned to the first physical zone 2-1. The remaining logical zones in segment 302 are assigned to physical zones that are incremented by one. That is, the first logical zone 302-1 is now at physical zone 2-2. The second logical zone 302-2 is now at physical zone 2-3. The remaining logical zones 302-X are assigned to physical zones 302-(x+1). The end physical zone 2-24 is assigned logical zone 302-23. The third segment 303 has logical zones assigned that are different from the first and second segment. Relative to segment 301, the logical zones of the third segment 303 are incremented by two physical zones. Specifically, the first physical zone 3-1 of segment 303 is assigned the logical zone 303-23. The second physical zone 3-3 of segment 303 is assigned the logical zone 303-24. The third physical zone 3-3 of segment 303 is assigned the logical zone 303-1. The last physical zone 3-24 of segment 303 is assigned the logical zone 303-22. This can continue for each successive segment 304-324 with the logical zones being incremented in location by one with each successive segment. For further illustration, the zone layout of the final segment 324 will be explained. The first physical zone 24-1 of final segment 324 is assigned the logical zone 324-2. The second physical zone 24-2 of final segment 324 is assigned the logical zone 324-3 and so on. The final or end physical zone 24-24 of final segment 324 is assigned the logical zone 324-1.

The reassigning of the physical zones, i.e., the exact physical location of the zones, to logical zones that are addressed by the controller or other computing systems can be further described as follows. The optical storage tape is divided into a plurality of at least N physical segments. The above examples illustrate twenty four segments but the number of segments is not limited to twenty four. Each of the segments is divided into at least M physical zones. The above examples illustrate twenty four physical zones in each segment but the number of zones is not limited to twenty four. The M logical zones are assigned to the M physical zones. However, logical zones of at least one segment are in a different order than the logical zones of another segment. The different order can be for adjacent physical segments, e.g., segment 305 has a different logical zone order than at least one of segment 304 or 306. In an example, a first logical zone is in a first physical zone and an Mth logical zone is in a last physical zone for a first segment and the Mth logical zone is in a first physical zone and an M−1 logical zone is in the last physical zone for a second segment. The M−1 logical zone is in a first physical zone and an M−2 logical zone is in the last physical zone for a third segment. The second logical zone is in a first physical zone and a first logical zone is in the last physical zone for an Nth segment.

While the above descriptions describe incrementing the position of logical zones by one for each successive segment, the present description is not so limited. For example, two adjacent segments may have the same logical zone layout and then the logical zones of the next segment or next pair of segments can have their logical zones shifted to different physical zones. Moreover, successive shifts are not limited to incrementing by one. That is the logical zones can be shifted by one, two, three or more at successive segments or successive locations where the logical zones are shifted relative to another segment.

As a result of the shifting logical zones on the storage tape segments having different layouts, when all of the optical pickup units are reading data from all of the first logical zones, e.g., zones 301-1, 302-1, 302-1, . . . 324-1 in the FIG. 3 example, each pickup unit is at a different position relative to the edge of its associated segment. Here, the pickup unit 112a for track 301 is energized to move to the topmost (relative to FIG. 3) zone 301-1. Energizing the pickup unit can be controlled by the controller 114 to provide a current to an actuator to move the pickup unit. In some use cases this requires the maximum current draw to move the pickup unit 112a to the first edge logical zone 301-1, which is the same as the physical zone 1-1. The pickup unit 112b is energized to move to the logical zone 302-1, which is at the physical zone 2-2. The pickup unit 112c is energized to move to the logical zone 303-1, which is at the physical zone 3-3. Likewise, the pickup unit 112x is energized to move to the logical zone 324-1, which is at the other edge of the segment 324 at physical zone 24-24. In this example, only two pickup units are fully energized to move to an edge logical zone, here pickup unit 112a is energized (e.g., maximum current) to the top most edge physical zone 1-1 and pickup unit 112x to the other edge physical zone 24-24. At least one of the pickup units will be in its at-rest position, i.e., not energized for movement when reading from the logical zone X-1. The pickup units will also be spaced from each other greater than the number of zones and a gap between the tracks when reading from logical zones that are the same address, e.g., "-1" addresses shown in FIG. 3. The spacing will depend on the amount of shift of the logical zones relative to physical zones in segments in which logical zones are shifted.

Figure 4:
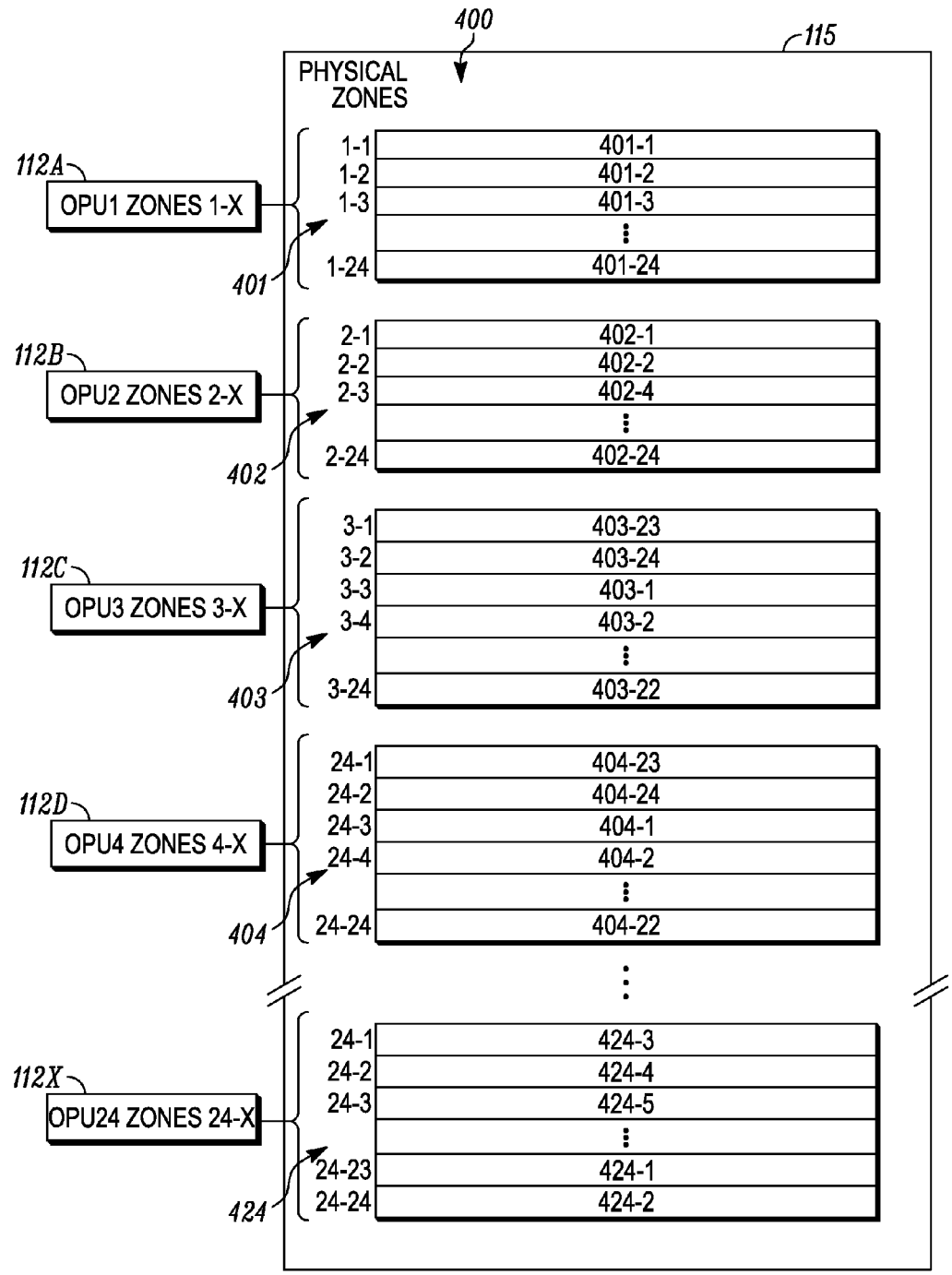
FIG. 4 shows an embodiment of a layout of a storage medium.

FIG. 4 shows a logical track/zone layout 400 of a storage medium, e.g., an optical storage tape 115. Layout 400 is similar to the FIG. 3 embodiment, however, the logical zones as shifted in pairs of segments and not in each successive segment. In the first segment, the first and second logical zones 401-1 and 401-2 correspond to the first and second physical zones 1-1 and 1-2. The third and fourth logical zones 401-3 and 401-4 correspond to the third and fourth physical zones 1-3 and 1-4. The last logical zone 401-24 corresponds to the last physical zone 1-24. In the second segment, the logical zones are assigned to the same physical zones as done the first segment. The logical zones 402-1, 402-2, 402-3, . . . 402-24 of the second segment 402 are not shifted relative to segment 401. The third and fourth segments 403 and 404 are shifted relative to the first pair of segments 401, 402. Here, the shift is two physical zones. The logical zones 403-24 and 404-24 are moved from the last physical zones 3-24 and 4-24 to the second physical zones 3-2 and 4-2. The logical zones 403-23 and 404-23 are moved from the second-to-last physical zones 3-23 and 4-23 to the first physical zones 3-1 and 4-1. The first and second logical zones 403-1 and 403-2 of segment 403 corresponds to the physical zones 3-3 and 3-4. The third and fourth logical zones 403-3 and 403-4 of segment 403 correspond to the fifth and sixth physical zones 3-5 and 3-6. The remaining logical zones in track 403 are assigned to physical zones that are incremented by two. The last physical zone 3-24 and 4-24 of segments 403 and 404 are assigned the logical zone 3-22 and 4-22. The fourth segment has the same logical zone layout as the third segment.

This layout scheme can continue for each successive pairs of segments 304-324 with the logical zones being incremented in location by two with each successive segment pair. For further illustration, the zone layout of the final track 424 will be explained. The first physical zone 24-1 of final segment 424 is assigned the logical zone 424-3. The second physical zone 24-2 of final segment 424 is assigned the logical zone 424-4 and so on. The end pair of physical zones 24-23 and 24-24 of final segment 424 are assigned the logical zones 424-1 and 424-2, respectively.

Figure 5:
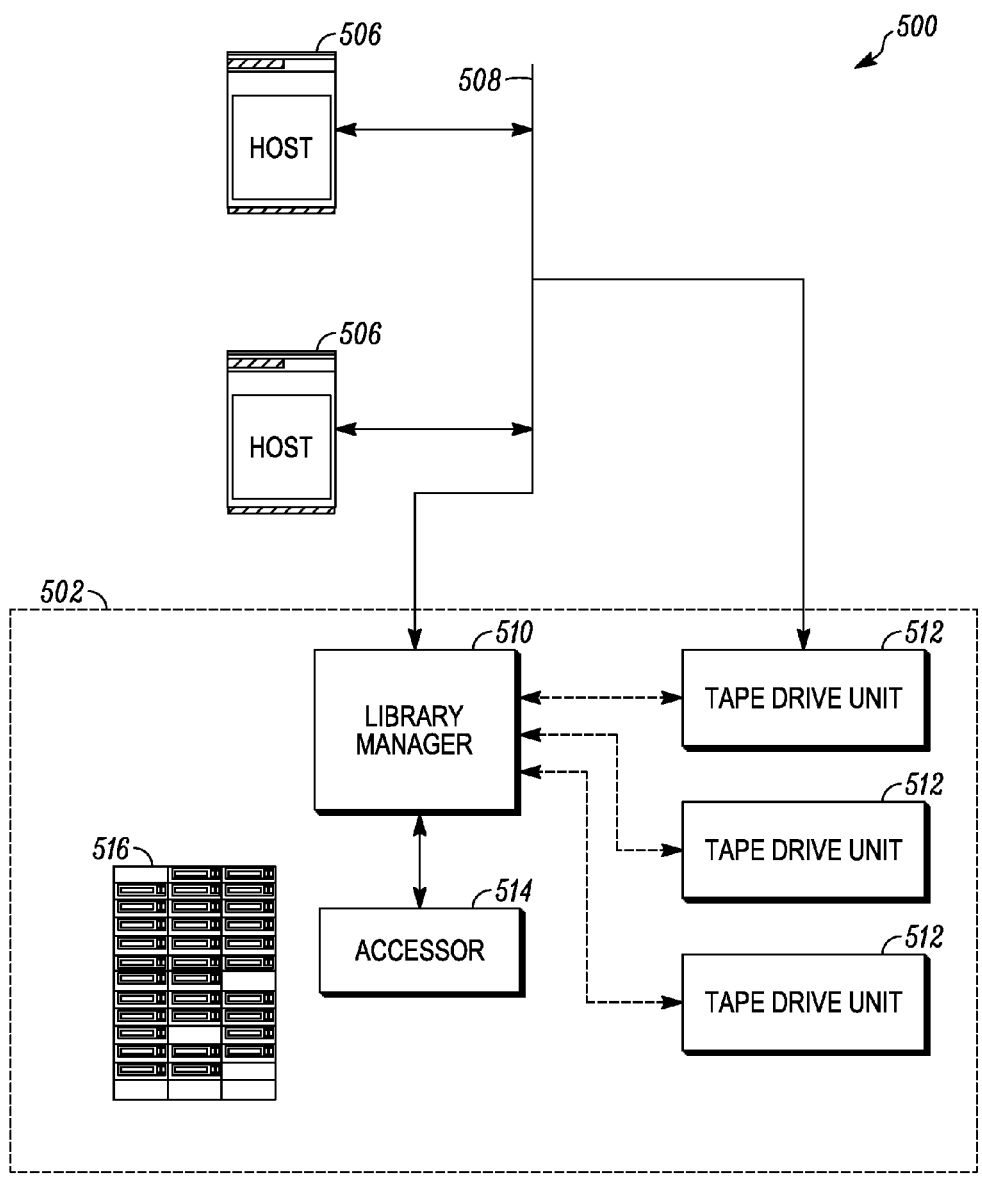
FIG. 5 shows an embodiment of a data storage system.

FIG. 5 depicts a schematic block diagram of one embodiment of a data storage system 500 that can be employed in accordance with the tape embodiments described herein. The data storage system 500 includes an optional automated tape library unit 502, and at least one host 506. Each host 506 may be a mainframe computer. Alternatively, the host 506 may be a server, personal computer using one of a variety of operating systems, or other computing devices. The host 506 is connected to the optional automated tape library unit 502 via a storage area network (SAN) or similar communication channel 508. Alternatively, the host 506 may be connected directly to a tape drive. The communication channel 508, in various embodiments, may be a FICON, fibre channel protocol, ESCON or other enterprise system connection.

The illustrated automated tape library unit 502 includes a library manager 510, one or more tape drive units 512, an accessor 514, and a plurality of tape storage media cartridges 516. The plurality of tape storage cartridges 516 may be stored in one or more media cartridge storage bins (not identified).

The library manager 510, which may include a computing processor (not shown) that includes processing circuitry and memory, is interconnected with and controls the actions of the tape drive units 512 and the accessor 514. The library manager 510 also may include one or more hard disk drives (not shown) for memory storage, as well as, a control panel or keyboard (not shown) to provide user input. The control panel may be, in one embodiment, a computer in communication with the library manager 510 so that a user can control the operating parameters of the automated tape library unit 502 independently of the host 506. The library manager 510 includes the assignment scheme for the layout of the zones on each track of a tape. In another example, each tape 516 includes a code that is read and sent to the library manager 510. The library manager 510 then determines the layout of the zones for the tape tracks to send appropriate control signals to the tape drive units 512 to access the data. The manager 510 can store the zone layout for a tape in a lookup table stored in memory.

FIG. 5 shows a plurality (here, three) tape drive units 512. The present disclosure is operable with one or any larger number of tape drive units 512. The tape drive units 512 may share one single repository of tape storage cartridges 516. Alternatively, the tape drive units 512 may independently correspond to and utilize multiple repositories of tape storage cartridges 516. The tape drive units 512 may advantageously be distributed over multiple locations to decrease the probability that multiple tape drive units 512 will be incapacitated by a disaster in one location. In an example, the tape drives include processors, memory and circuitry that can be used to determine or store the logical zone layout for a given tape 516. The tape drive units 512 can include the assignment scheme for the layout of the zones on each track of a tape. In another example, each tape 516 includes a code that is read and sent to the tape drive unit 512 when the tape is loaded. The tape drive unit 512 then determines the layout of the zones for the tape tracks to send appropriate control signals to the optical pickup units to access the correct data.

The interconnections between the library manager 510, the tape drive units 512, and the accessor 514 are shown as dashed lines to indicate that the depicted library manager 510 transmits and receives control signals to the tape drive units 512 and the accessor 514. Data for storage or retrieval may be transmitted directly between the host 506 and the tape drive units 512 via a communication channel 508, which may be a storage area network (SAN), a local area network (LAN), a wide area network (WAN), or a different type of network, such as the ESCON, FICON, the Internet or a direct connection between the host 506 and the tape drive devices 512.

The accessor 514 may be a robotic arm or other mechanical device configured to transport the selected tape storage cartridges 516 between a storage bin and a tape drive unit 512. The accessor 514 typically includes a cartridge gripper and an optical label scanner (not shown), e.g., a bar code scanner, or similar read system, mounted on the gripper. The optical label scanner is used to read a volume serial number (VOLSER) or other identifiers printed on a cartridge label affixed to the cartridge 516. Similarly, the tape storage cartridges 516 may be replaced by other storage media cartridges utilizing magnetic media, optical media, or any other removable media corresponding to the type of drive employed. The tape drive units 512 or the library manager 510 may use the bar code on the tape cartridge 516 to determine the zone layout scheme for the individual tape. The bar code can be a traditional bar code, a matrix bar code (e.g., a QR code), a three dimensional code, near field communication, iBeacons, clickable paper or other identifying data on the cartridge.

In a simplified example, a personal computer can include a library manager 510 and the tape drive unit 512, which can be an optical storage media system that includes an alternative optical media form. The tape drive unit 512 can be sized to fit into a component bay of a computer, e.g., a typical DVD drive sized bay of a personal computer (PC). The optical storage system includes the logical track system and method described herein. Alternative optical media form may be constructed of a phase change optical media employing red, blue, or UV laser with one or more pickup heads for recording to and reading from alternative optical media form. Other types of optical media such as dye for WORM and magneto-optical for erasable optical media may also be suitable. The personal computer includes a nonvolatile and volatile memories. The optical drive 512 communicates with the nonvolatile memory, e.g., a hard drive or solid state, using a portion of a predetermined size of the nonvolatile memory to improve random access to information on alternative optical media form. It may be possible that alternative optical media form, through optical drive 512 offers a transfer rate that may be faster than a disk drive. This may be accomplished in various ways, with one way being increasing the number of pickup units in optical drive 512 used to record or read alternative optical media form. An increase in pickup heads may directly enable faster data transfer rate to/from alternative optical media form. The alternative media form can include the logical zone layouts as described herein.

When system is used in an audio or video entertainment application, there may be unique algorithms and formats applied to the portion of the nonvolatile memory that allow users to rapidly access portions of the information stored on alternative optical media form. As an example, the algorithms may allow a user to view thumbnails of movie scenes located at different physical locations on alternative optical media form, and then access a selected movie. These algorithms and formats may include index or location information of the movies associated with the thumbnails on alternative optical media form, enabling fast access to the selected movie. Information stored on the nonvolatile memory may include tracking data that determines what information may be only on alternative optical media form and what has been transferred to the nonvolatile memory.

Other uses for tape storage system include archive and backup of images, home movies, business information, or archive library services.

The present structures and methods described herein assign logical zones to be different from the physical zones in some segments or one segment of data storage medium, e.g., tape. This allows the physical tolerances associated with dynamic range of each pickup unit to be met and it maximizes the probability of more heads being able to reach all the desired physical location in tracks to read the data stored in tracks within the zones. In most read or write scenarios using the presently described examples, not all heads need to move to the physical edge when the controller calls for the pickup units to read/write at the first logical address or the last logical address of a segment as these logical addresses are remapped to different physical zones in the segments on the tape. Moreover, the presently described structures and methods decreases maximum power needed to move the pickup units as moving all heads to zones at the far edges of the segments are avoided since power consumed by the dedicated head actuators increase as the pickup units move from the center of the associated zones cause significant energy draw. Such significant energy, e.g., current, draw also undesirably produces significant amounts of heat. Such heat production is also reduced.

Figure 6:
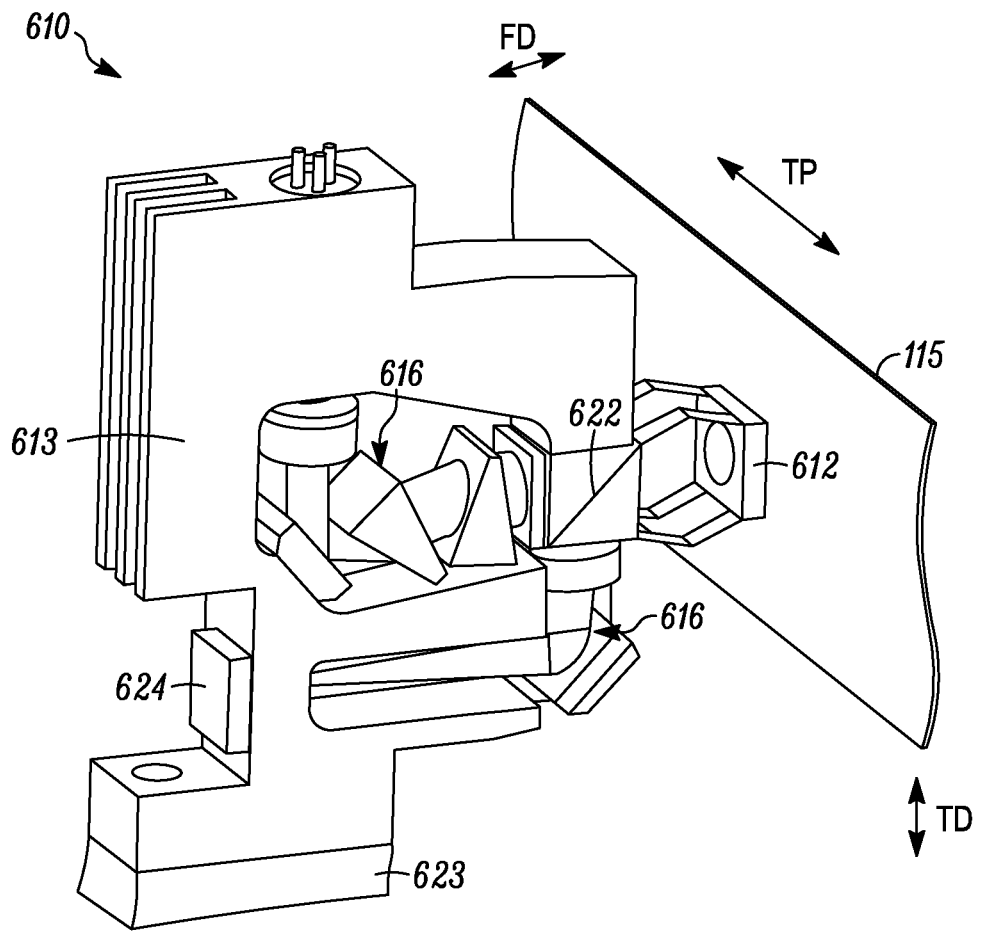
FIG. 6 shows an embodiment of an integrated pickup head design.

FIG. 6 shows an optical pickup unit 112 with an objective lens housing 612 on a base 613. An emitter (e.g., a laser) 614 projects light through a projection lens set 616 to the optical data storage tape 115. The light reflects off of the reflection lens set 620 through a polarizing beam splitter 622 (through which the light was initially transmitted by the projection lens set 616) that directs the light through the reflection lens set 620 to the photo diode integrated circuit 624. In an example, the pickup unit 112 includes multiple photodetectors.

The optical data storage tape 115 is moved in a tape path direction TP which may also be referred to as the direction X. The objective lens housing 612 is designed to be moveable in a tracking direction TD, or Y direction by application of an electrical signal to an actuator 623. The objective lens housing 612 is also moveable in a focusing direction FD, or direction Z. Details of the objective lens housing 612 are described in U.S. Pat. No. 8,514,675, which is hereby incorporated by reference for any reason.

In use, one or more optical pickup units 610 may each be dedicated to the segments on the optical tape, each optical head having its own actuator for the purpose of tracking and focusing on a track within a zone of a segment. The range of motion of each head may overlap segments of adjacent pickup units. The overlap may occur in the gap between segments.

The optical pickup units are adapted for reading and/or writing data from/to optical tape. The optical units may be capable of reading and/or writing data on an optical tape. The optical tape may include formatted digital data in a phase change layer and it may be adapted to be written upon, re-written upon, erased and/or read from. The optical pickup unit may include a transport facility for the optical head, a read head, a write head, a read/write head, a direct read after write head, an articulation unit for optical head positioning, demodulation facility for decoding the data on elongate data storage medium, e.g., magnetic or optical tape, and the like. The optical head may include a light source, a lens, an actuator, a beam splitter, a beam polarizer, an electro-optic integrated circuit, and/or other systems. It should be understood that the optical pickup unit may be capable of reading, writing, reading and writing, directly reading after writing, or it may be otherwise configured to meet the needs of the particular application.

In an example, a transport facility may contain and support containing a number of individual optical pickup units. In an embodiment, the number of individual optical pickup units in the transport facility may be based on the size of the head transport facility and the number of segments and optical tape width required to be covered. For example, if there are one thousand segments on the optical media and each individual optical pickup unit may be capable of covering two hundred zones within a segment, there may only be five individual optical pickup units in the transport facility. In an embodiment, the number of optical pickup units may not be directly related to the number of segments and the number of segments that each individual optical pickup unit may cover. There may be a certain number of segments overlapped between individual optical pickup units and therefore increase the number of optical pickup units needed for a certain number of tracks. Each optical pickup units may be independent in its ability to control both focus and data track acquisition. Each optical pickup unit may be aligned to any of the plurality of data zones within a dedicated area.

The processes, methods, or algorithms disclosed herein may be deliverable to implement by a processing device, controller, computer, which may include any existing programmable electronic control unit or dedicated electronic control unit, or circuitry. Similarly, the processes, methods, or algorithms may be stored as data and instructions executable by circuitry, a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms may also be implemented in a software executable object. Alternatively, the processes, methods, or algorithms may be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. It will be recognized that when software instructions are loaded into a controller, processor or circuitry, then such structures are specific, dedicated machines to execute the loaded instructions.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. An optical data storage tape comprising:
at least N physical segments;
at least M physical zones in each segment, wherein the physical zones are sequentially the same in each segment;
at least M logical zones assigned to the M physical zones; and
wherein a first logical zone of the logical zones in a first physical segment of the physical segments is assigned to a first physical zone of the first physical segment;
wherein a first logical zone in a second physical segment of the physical segments is not assigned to a first physical zone of the second physical segment.

2. The optical tape of claim 1, wherein the first logical zone in the second physical segment is assigned to a second physical zone in the second physical segment; and
wherein a first logical zone in a third physical segment of the physical segments is not assigned to a first physical zone or a second physical zone of the third physical segment.

3. The optical tape of claim 1, wherein the first logical zone is in the first physical zone and an Mth logical zone is in a last physical zone for the first physical segment.

4. The optical tape of claim 3, wherein an Mth logical zone is in a first physical zone and an M−1 logical zone is in the last physical zone for the second physical segment.

5. The optical tape of claim 4, wherein an M−1 logical zone is in a first physical zone and an M−2 logical zone is in the last physical zone for a third physical segment.

6. The optical tape of claim 5, wherein a second logical zone is in a first physical zone and a first logical zone is in the last physical zone for an Nth physical segment.

7. An optical data storage tape system comprising:
N optical tape drive units for reading a plurality of logical storage segments;
an optical tape to be read by the optical tape drive units, the optical tape having a plurality of physical segments that are associated with the logical storage segments, respectively, the physical segments each having M physical zones that are each arranged in a same physical sequence; and
wherein logical zones of adjacent physical segments are in a different order with a first drive unit of the optical tape drive units reading a first logical zone of a first logical segment of the logical storage segments being in a different position than a second drive unit of the optical tape drive units reading a first logical zone of a second logical segment of plurality of logical storage segments.

8. The system of claim 7, wherein a first physical segment includes logical zones in the order of [1, 2, 3, . . . M−1, M].

9. The system of claim 8, wherein a second physical segment includes logical zones in the order of [M, 1, 2, 3, . . . M−1].

10. The system of claim 9, wherein a third physical segment includes logical zones in the order of [M−1, M, 1, 2, 3, . . . M−2].

11. The system of claim 10, wherein an Mth physical segment includes logical zones in the order of [M−(M−1), . . . M−1, M, 1].

12. The system of claim 7, wherein the N optical tape drive units have at least one read head not at an edge of a physical segment when reading a same logical segment.

13. The system of claim 7, wherein the N optical tape drive units have at most two read heads at an edge of a physical segment when reading a same logical segment.

14. The system of claim 7, wherein the logical zones are uniformly scattered among different physical segments.

15. The system of claim 7, wherein the N optical tape drive units consume at most half power as compared to case with all heads of the at least one read head N optical tape drive units being at an edge of a physical segment.

* * * * *